(12) United States Patent
Pistilli et al.

(10) Patent No.: US 12,255,788 B1
(45) Date of Patent: Mar. 18, 2025

(54) MANAGEMENT SYSTEM FOR COMPUTING PLATFORMS

(71) Applicant: Morgan Stanley Services Group Inc., New York, NY (US)

(72) Inventors: Laurie Pistilli, Hoboken, NJ (US); Radhika Aasoori, Edison, NJ (US); Ram Challagandla, Robbinsville, NJ (US); Abhimanyu Ghei, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/904,535

(22) Filed: Oct. 2, 2024

(51) Int. Cl.
*H04L 41/5009* (2022.01)
*H04L 43/16* (2022.01)

(52) U.S. Cl.
CPC .......... *H04L 41/5009* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 6,715,097 B1 | 3/2004 | Kidder et al. | |
| 7,143,153 B1 | 11/2006 | Black et al. | |
| 10,270,796 B1 | 4/2019 | Veeraswamy et al. | |
| 10,305,758 B1 | 5/2019 | Bhide et al. | |
| 10,505,825 B1 | 12/2019 | Bettaiah et al. | |
| 11,093,518 B1 | 8/2021 | Lu et al. | |
| 11,366,842 B1 | 6/2022 | Swaminathan et al. | |
| 11,392,605 B1 | 7/2022 | Baskaran et al. | |
| 2005/0119905 A1 | 6/2005 | Wong et al. | |
| 2005/0125449 A1 | 6/2005 | Wong et al. | |
| 2005/0125450 A1 | 6/2005 | Wong et al. | |
| 2005/0125768 A1 | 6/2005 | Wong et al. | |
| 2006/0037022 A1 | 2/2006 | Byrd et al. | |
| 2013/0212574 A1 | 8/2013 | Hutchinson et al. | |
| 2015/0040229 A1 | 2/2015 | Chan et al. | |
| 2016/0182305 A1 | 6/2016 | Martin et al. | |
| 2016/0364281 A1 | 12/2016 | Lange et al. | |
| 2016/0364282 A1 | 12/2016 | Baron et al. | |
| 2016/0364283 A1 | 12/2016 | Baron et al. | |
| 2016/0364314 A1 | 12/2016 | Baron et al. | |
| 2016/0366021 A1 | 12/2016 | Baron et al. | |

(Continued)

*Primary Examiner* — Anh Nguyen
(74) *Attorney, Agent, or Firm* — K&L Gates LLP

(57) ABSTRACT

Systems and methods monitor performance of a computing platform, including identifying infrastructure components associated with computing platforms of an organization, identifying component dependency between different infrastructure components across all system resources an enterprise network, and correlating the performance of an infrastructure component with business related KPIs for the platform. The platform management system generates a metadata representative of each the computing platform so that a graphical user interface (GUI) can provide real-time or near real-time data analytics to client devices, within a private enterprise cloud network. The performance platform management system may automatically take actions in response to identified infrastructure issues based on predetermined resolution procedures, individual configurations (based on permissions), or client interaction through the GUI.

20 Claims, 10 Drawing Sheets

(56) References Cited

U.S. PATENT DOCUMENTS

| | | |
|---|---|---|
| 2016/0366033 A1 | 12/2016 | Lange et al. |
| 2017/0017368 A1 | 1/2017 | Maheshwari et al. |
| 2017/0351720 A1 | 12/2017 | Alekseyev et al. |
| 2018/0139116 A1* | 5/2018 | Ricci .................. H04L 43/0876 |
| 2019/0095478 A1 | 3/2019 | Tankersley et al. |
| 2020/0052979 A1* | 2/2020 | Clemm ............... H04L 41/5019 |
| 2020/0311304 A1 | 10/2020 | Parthasarathy |
| 2021/0019338 A1* | 1/2021 | Grampurohit ........ G06F 3/0481 |
| 2022/0038330 A1 | 2/2022 | Dutta et al. |

* cited by examiner

MANAGEMENT SYSTEM FOR COMPUTING PLATFORMS

BACKGROUND

Large organizations, such as financial services firms, often employ many computer-based platforms, each for performing a business-related process or service for the organization. Such platforms may employ several software applications and may be distributed across many network and infrastructure hardware components of the organization, including cloud networks in some instances. Often, some applications and network resources may be used by multiple platforms.

A platform's hardware infrastructure can include servers, storage systems, networking equipment (e.g., routers, switches, firewalls), and end-user devices (e.g., desktops, laptops, mobile devices). Operating systems manage hardware resources and provide common services for application software. Middleware connects different applications and allows them to communicate and share data. Applications perform specific tasks for users and other applications, such as customer relationship management (CRM), enterprise resource planning (ERP), and wealth management platforms (e.g., Account Opening, Trading, Order Management, Supervision, Risk Management). Database management systems store, manage, and retrieve data, while network components enable data transfer and communication between different parts of the organization and with external entities.

The applications for an organization's platforms are often distributed across various network components due to performance, scalability, redundancy, and geographical distribution. For instance, customer relationship management (CRM) systems might be hosted on multiple servers to handle large volumes of customer data and interactions efficiently. Trading platforms, which require low latency and high-speed connections, are distributed across different data centers. Enterprise resource planning (ERP) systems integrate various business processes and are often spread across multiple servers and locations. Data analytics and reporting tools collect and analyze data from various sources across the organization, often requiring distributed processing to handle large datasets. Compliance and regulatory applications ensure the organization adheres to industry regulations and standards, requiring data from multiple systems and locations. Some applications and network resources, such as databases and middleware, might be shared across multiple platforms to improve efficiency and consistency.

Real-time monitoring of applications and network components is crucial for several reasons. Performance management ensures that applications are running optimally and that any performance issues are quickly identified and resolved to maintain user satisfaction and productivity. Security is another critical aspect, as real-time monitoring detects and responds to security threats, such as unauthorized access, malware, and data breaches, in real-time to protect sensitive financial data. Reliability and uptime are maintained by monitoring system health and detecting failures or potential failures in hardware, software, or network components, allowing for immediate intervention to minimize downtime. Compliance is ensured by continuously monitoring and logging activities, helping the organization adhere to regulatory requirements and avoid penalties and legal issues. Real-time monitoring also aids in capacity planning by providing insights into resource utilization, helping the organization plan for future growth and scale its infrastructure accordingly. Incident response is facilitated by providing real-time data and alerts, allowing for rapid response to incidents and reducing their impact on the business. Also, customer experience is enhanced by ensuring that online services, such as banking portals and trading platforms, are available, responsive, and secure at all times.

A centralized platform management system can be invaluable for quickly diagnosing a root cause of a platform issue. Prior systems relied on disparate IT systems to perform individual analysis that can be time consuming and duplicate task. Additionally, this disparate analysis may identify symptoms of a network issue without identifying the underlying cause of the issue.

SUMMARY

In one general aspect, the present invention is directed to a platform management system configured to intelligently detect metadata, monitor performance, and alert or resolve network issues associated with computing platforms of an organization. The system can autonomously tag metadata to identify component dependencies between different network resources and business units, across all resources in the system, and correlate the performance of applications, APIs and infrastructure components with key performance indicators (KPIs) for the business function supported by the computing platform. The system can generate a metadata-based representation for the computing platform that captures the relationships between components and KPIs for the platform, and generate an interactive, dynamic, real-time user interface through which a user can monitor the status of the network components, applications and KPI's for a platform in real time. Additionally, the performance management system may automatically take actions based on a predetermined resolution procedure or playbook, individual configurations (based on permissions), or client interactions through a user interface.

In various embodiments, a system according to the present invention comprises front-end server configurable to host a graphical user interface (GUI) and a back-end server system communicably coupled to the front-end server and to the plurality of applications and the network infrastructure components for implementing the computing platforms for the enterprise. The back-end server system is configured to: collect and extract data from a plurality of sources related to a first computing platform of the computing platforms; identify the network infrastructure components and applications for the first computing platform based on the extracted data for the first computing platform; generate metadata for each of the identified network infrastructure components and the applications associated with the first computing platform, where the metadata describes application-level relationships with the network infrastructure components and dependency relationships between different network infrastructure components of the first computing platform; determine correlations between pre-determined key performance indicators (KPIs) for the first computing platform and the metadata; and determine KPI values for the pre-determined KPIs associated with the first computing platform based on the correlations. The front-end server is configured to render the metadata and host the GUI for network resources (e.g., DB, NAS, custom private cloud, message queue, Kafka, Virtual/Physical Server, network bandwidth, bytes sent/received). The GUI comprises a plurality of selectable icons comprising infrastructure metric icons (e.g., windows health, load balancer, JVM health), application icons (e.g., risk profile API, trade parameters, batch status, position update, account API, restriction service, order maintenance service, financial service), resource dependency icons (e.g., order ROS, order orchestrator, order manager, PNS intraday, execution OSM), and KPI icons (equity orders, option orders, FI orders, MF orders, UIT order, total orders). Each of the infrastructure metric icons corresponds to a performance metric for one or more of the network infrastructure components of the first computing platform and dynamically indicates a real-time status of the network infrastructure components; each of the application icons corresponds to one of the applications of the first computing platform and dynamically indicates a real-time status of the applications; and each of the KPI icons corresponds to one of the KPIs of the first computing platform and dynamically indicates a real-time status of the KPIs.

The platform management system according to embodiments of the present invention can, therefore, monitor the platform as a whole, and not merely individual applications or network components utilized by the platform. Also, it can monitor business-related KPIs so that a user of the service can, at one time, see how business-related KPIs are affected by the performance of the technological components of the platform. These and other benefits that can be realized through embodiments of the present invention will be apparent from the description that follows.

FIGURES

Various embodiments of the present invention are described herein by way of example in conjunction with the following figures.

DESCRIPTION

Figure 1:
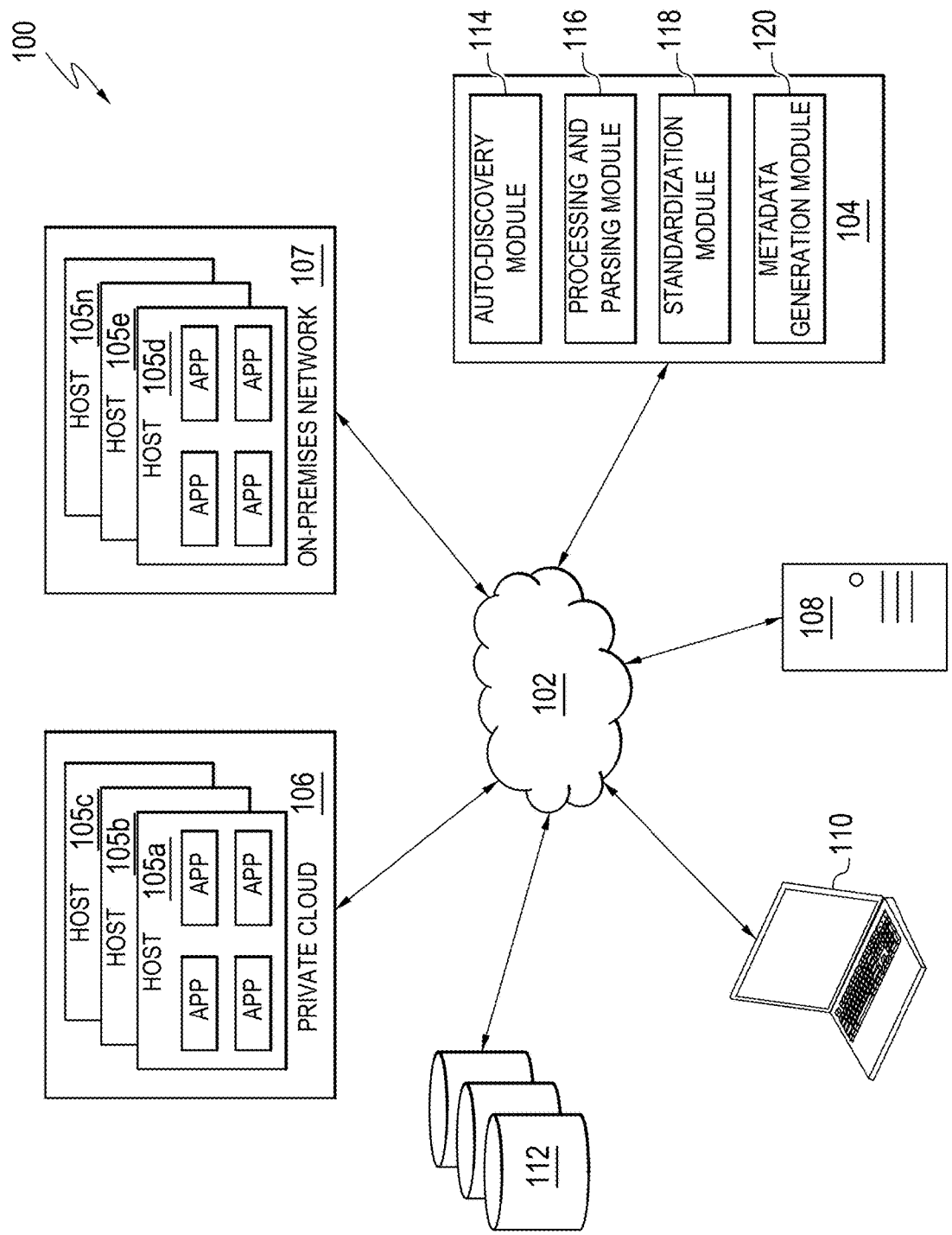
FIG. 1 shows a block diagram of a platform management system for automatically detecting network resources and monitoring, in real-time or near-real-time, the performance of a computing platform, or multiple platforms at once if applicable, of an organization according to at least one embodiment of the present invention.

FIG. 1 shows a block diagram of a platform management system 100 for automatically detecting network resources and monitoring, in real-time or near-real-time, the performance of a computing platform, or multiple platforms at once if applicable, of an organization according to at least one embodiment of the present invention. Each platform may support, or implement, a corresponding business-related function of the organization. For example, if the organization provides wealth management services, one platform could be used for generating trades of financial securities. Another platform could be used for account opening, strategy builder, portfolio management, trading, order entry and management, or Risk Management.

The performance management system 100 can comprises a server system 104 (comprising one or more internetworked servers, and referred to in the singular as "server 104" for simplicity unless otherwise noted) communicably coupled, through respective program application interfaces (API), with the computer and network infrastructure of the organization that implement its computing platforms. The server system 104 may be in communication with the various computer and network infrastructure of the organization via an enterprise network 102 of the organization, which may include, for example, a private enterprise cloud network, a local area network (LAN), a wide area network (WAN), etc. The enterprise network 102 may comprise a plurality of local and distributed network resources or components. A private enterprise cloud network, of the organization, may be separated from a WAN of the organization by a gateway service imposing security rules through a firewall. In one example, the gateway service may impose rules to address unauthorized platform or application access, or entitlement access controls to manage platform or application access authorization.

The server system 104 may comprise an auto-discovery module 114, a processing and parsing module 116, a standardization module 118, and a metadata generation module 120. Additionally, the server system 104 may comprise a plurality of severs, where each server may host the auto-discovery module 114, the processing and parsing module 116, the standardization module 118, and the metadata generation module 120, separately. The auto-discovery module 114 may collect infrastructure data and key performance indicators (KPIs) associated with one or more respective computing platforms of the organization. The infrastructure data and KPIs may be stored on network resources, infrastructure components, or a database 112 within (or connected to) the enterprise network 102. The data processing module 116 may perform data processing to identify key infrastructure components for each of the computing platforms and, for any one of the platforms, correlates the infrastructure data of a component with the business related KPIs that the platform supports. For example, where the platform is configured for trading securities, the KPIs are related to trading securities, such as how many trades is it presently processing (or has processed in a given time period), the number of trades at various trade stages (e.g., pending, executed, confirmed, under review, etc.). The standardization module 118 may normalize and standardize the collected data to ensure consistency and uniformity across different types of infrastructure components. The data standardization processes may include mapping data attributes to a common schema and applying normalization rules to handle variations in data formats and conventions. This allows for data to be reliably analyzed from different data sources. The metadata generation module 120 of the server system 104 may generate metadata representative of the correlated data so that it may be displayed in a customizable output interface for a user 110 of the management system. In one example, the generated metadata comprises a script file (e.g., JSON file) that details the network resource metrics, KPIs, relationships, dependencies, and thresholds for a platform.

FIG. 1 further shows an example of the computer and network resources that might be utilized by a platform, such as a private cloud network 106 (e.g., Treadmill) and an on-premises network 107 (e.g., local data center). Each of these networks 106, 107 may comprise a plurality of infrastructure components, such as hosts 105*a-n* and load balancers (not shown), for example. Also, the various hosts 105*a-n* may host multiple software applications (shown as "APP" in FIG. 1). A platform may utilize multiple applications to implement its business function, and those apps may be hosted by various hosts 105*a-n* distributed throughout the platform's network. Also, some applications and some hosts may be utilized infrastructure components by multiple, different platforms. For example, an application for two-factor authentication or risk modeling may be used by a trading platform as well as other platforms of a wealth management firm. However, the use of shared resources can create difficulties in attributing PKIs to specific components in traditional monitoring systems.

The components of the platform's network may generate data logs that store KPIs associated with the performance of the platform and infrastructure performance data associated with the underlying infrastructure components that support the computing platform. The data logs may include, for example, system logs containing information about the operating system and its components, application logs providing details about an application's behavior and errors, network logs capturing network traffic details, audit logs recording security-related events and user activities, database logs storing database operations and transactions, and middleware logs including logs from web servers, message brokers, etc. The auto-discover module 114 may employ a log aggregation tool(s) like ELK (Elasticsearch, Logstash, Kibana) Stack, Splunk, Loki, or App Dynamics to collect and centralize the plurality of data logs from the various platform components for further data analysis. Such aggregation tools can collect data from various sources like applications, hosts, and network devices, and parse and transform the collected data into a format that allows for fast and efficient searching and analysis. The data logs may be stored in an on-premises database and/or a cloud database, for example. The server's aggregation tool(s) can periodically update the platform data (e.g., batch data can be updated in 15-minute intervals).

In one example, the plurality of data logs and infrastructure data may indicate that there is an outage at a load balancer (e.g., infrastructure component) utilized by a trading platform being monitored. Due to the outage of the load balancer, rather than utilizing a plurality of computational servers to process trades, the trading platform may be forced to route all trades through a single host or datacenter, over a given period of time. Accordingly, the enterprise trading platform may not scale computation resources during periods of high demand. Under normal operating conditions, the platforms may be configured to anticipate high trading volume at specific times of the day, days of the week, or in response to scheduled or unscheduled events and may employ one or more load balancers to account for fluctuation in trading volume.

In another example, an infrastructure component outage in the enterprise trading platform may limit the number of trades to x trades, over the given period (e.g., in one day), but it was predicted to execute Y trades under fully operational infrastructure conditions. Here, the server system 104 can correlate the number of executed trades (e.g., a KPI for the platform) to the load balancer outage and quantify the lost utilization at Y-X unexecuted trades. The platform management system may also display the impact on infrastructure load, applications, and a higher threshold level in a service level agreement. In another example, the performance management system may plot trend lines of for a real-time status of an infrastructure component KPI against a baseline value or expected value. The performance management system may monitor any deviations between the actual and expected values as an indication of the current state of the platform performance.

The auto-discover module 114 may collect infrastructure data from a plurality of sources within the network, associated with the infrastructure components. These sources may include system APIs, configuration files, network scans, deployment tools, and monitoring agents deployed across the infrastructure. The auto-discover module 114 may also collect infrastructure data through an agentless discovery approach that minimizes the need for installing additional software agents on each system. The agentless discovery approach leverages existing system capabilities and network protocols to gather relevant data. The auto-discover module 114 relies on multiple data sources (e.g., windeploy, webfarm, custom private cloud, or other sources specific to the organization's infrastructure environment) and aggregates information. This ensures comprehensive coverage and accuracy in the metadata generation. The auto discover platform 114 continuously monitors the infrastructure environment for changes and updates. As new components are added or configurations are modified, the auto-discovery module 114 dynamically adjusts its discovery process to capture these changes in real-time. This ensures that the metadata remains up-to-date and reflective of the current state of the infrastructure.

During the data is collected by the auto-discovery module 114, the processing and parsing module 116 may extract data about infrastructure components including hardware specifications, network configurations, software dependencies, service endpoints, and communication patterns between components. The extracted data may be configured as structured data (e.g., computing platform data, KPIs, infrastructure data) from unstructured log entries. For example, the data logs may capture timestamps, source and destination IP addresses/ports for data packet logs, process identifiers (PIDs), error and status codes, and configuration details for infrastructure components. The timestamp data may be used to identify network events and correlate dependency between different infrastructure components. In one example, timestamp data may be extracted from different sources and needs to be normalized by the standardization module 118, according to common schema or rule. This allows for the processing module 116 to correlate different data logs in different sources based on the timestamp data. The source and destination IP addresses/ports may be used for discovering infrastructure components and establish interactions for the platform. Process identifiers may be used to track different processes and their spawning relationships. In various embodiments, the server system 104 may discover network resources or infrastructure components based on service names (e.g., restriction service, order maintenance service, PM trade service, order enrichment service, financial service) and endpoints from the service and endpoint information of logs. Additionally, the server system 104 may rely on error and status codes to identify network issues (e.g., network congestion, latency, processing delay, no responsive components), operational statuses of components (e.g., online, offline, standby, error, reboot), and configuration setting for specific infrastructure components that can be used to correlate applications and services.

The auto-discovery module 114 may automatically identify network resources (e.g., infrastructure components, APIs, applications, databases) that are associated with specific computing platforms for the organization. However, due to the interdependence of network resources used by the various computing platforms of the organization, the processing module 116 of the server system 104 may need to cross-reference a plurality of different sources (e.g., different logs) to identify relevant network resources for a particular platform. This process may include identifying network traffic patterns based on packet load, transmission times, and source or destination addresses. In one example, the server system 104 may employ regular expressions (regex) to identify specific patterns related to known applications and infrastructure components. Further, the server system 104 may employ machine learning techniques to detect unusual patterns or anomalies that could indicate new or misconfigured components.

The server system 104 may employ various techniques for correlating infrastructure component dependencies that identify request-response patterns, including trace requests, trace route, ACK message from entry points (e.g., load balancers) through the application stack to the database. Additionally, the log aggregation tool may be configured to analyze logs for keywords or patterns associated with specific applications or services. For example, entries related to "MySQL connection" or "Starting Apache web server" may include data (e.g., data format, nomenclature, etc.) that indicates the presence of those applications. In another example, the server system 104 may correlate infrastructure dependency based on cloud-specific information from registries that can be matched against known service names or APIs. Services such as an "EC2 instance" or an Azure "Virtual Machine" may employ cloud map entries to point towards the cloud computing platform that is being used. Ultimately, the server system 104 can map the infrastructure component dependencies throughout the enterprise private cloud network to help identify the source of system issues by observing which services call others.

A traditional resource monitoring system may determine non-business related KPIs for network components (e.g., load balancer and web server, etc.). However, without mapping network dependencies, the system would not recognize that the infrastructure components might be downstream components and not the source of the infrastructure issue.

In contrast, with various embodiments of the present invention, once the server system 104 determines correlations between the infrastructure data and KPIs, the server system 104 can generate metadata, through a metadata generation module 120, that indicate dependency relationships between infrastructure component for the computing platform. In the event of an infrastructure issue arises in the network 102, the server system 104 may trace the issue to the source infrastructure component based on the dependency metadata. For example, one log may show an issue associated with a first component based on a single log in the computing platform. However, the poor performance of the first component may be a downstream effect from a second, upstream component. Without dependency information linking the first component with the second component, an incorrect determination might be made that the source of the issue is the first component. In contrast, with embodiments of the present invention, the metadata can be used to create visualizations and dashboards to represent the discovered infrastructure components and their interactions so that the true source of an issue can be identified. The server system 104 may employ data visualization tools such as Kibana or Grafana to help in create meaningful visualizations.

Kibana relies on Logstash, another component of the ELK Stack, to gather data from various sources like applications, servers, or network devices. Logstash processes and transforms this data into a format that Elasticsearch understands. The processed data is then stored in Elasticsearch, the search and analytics engine. Kibana connects to Elasticsearch to retrieve specific data based on user queries or visualizations being built. Kibana offers a variety of visualization options like line graphs, bar charts, pie charts, heatmaps, and time series graphs. Users can create dashboards that combine these visualizations to explore their data from multiple angles. Kibana also integrates with Elasticsearch's powerful search functionality, allowing users to filter and drill down into their data very precisely primarily. Grafana connects directly to various data sources like databases (e.g., MySQL, PostgreSQL, SQL Server, IBM DB2, MongoDB, Apache Derby), time series databases (e.g., InfluxDB, Cortex), cloud platforms (e.g., AWS, Google Cloud), and even custom APIs or custom cloud solutions (e.g., Kubernetes/private/public cloud solution). Users need to configure the connection details for each data source. Once connected, users write queries specific to the data source to retrieve the desired data. Grafana offers a query builder to help users construct these queries. Similar to Kibana, Grafana provides a wide range of visualizations like bar charts, scatter plots, gauges, and heatmaps. Users can drag-and-drop these visualizations onto dashboards to create custom layouts for data exploration. Grafana also offers a high level of customization for these visualizations, allowing users to tailor them to their specific needs.

Figure 2:
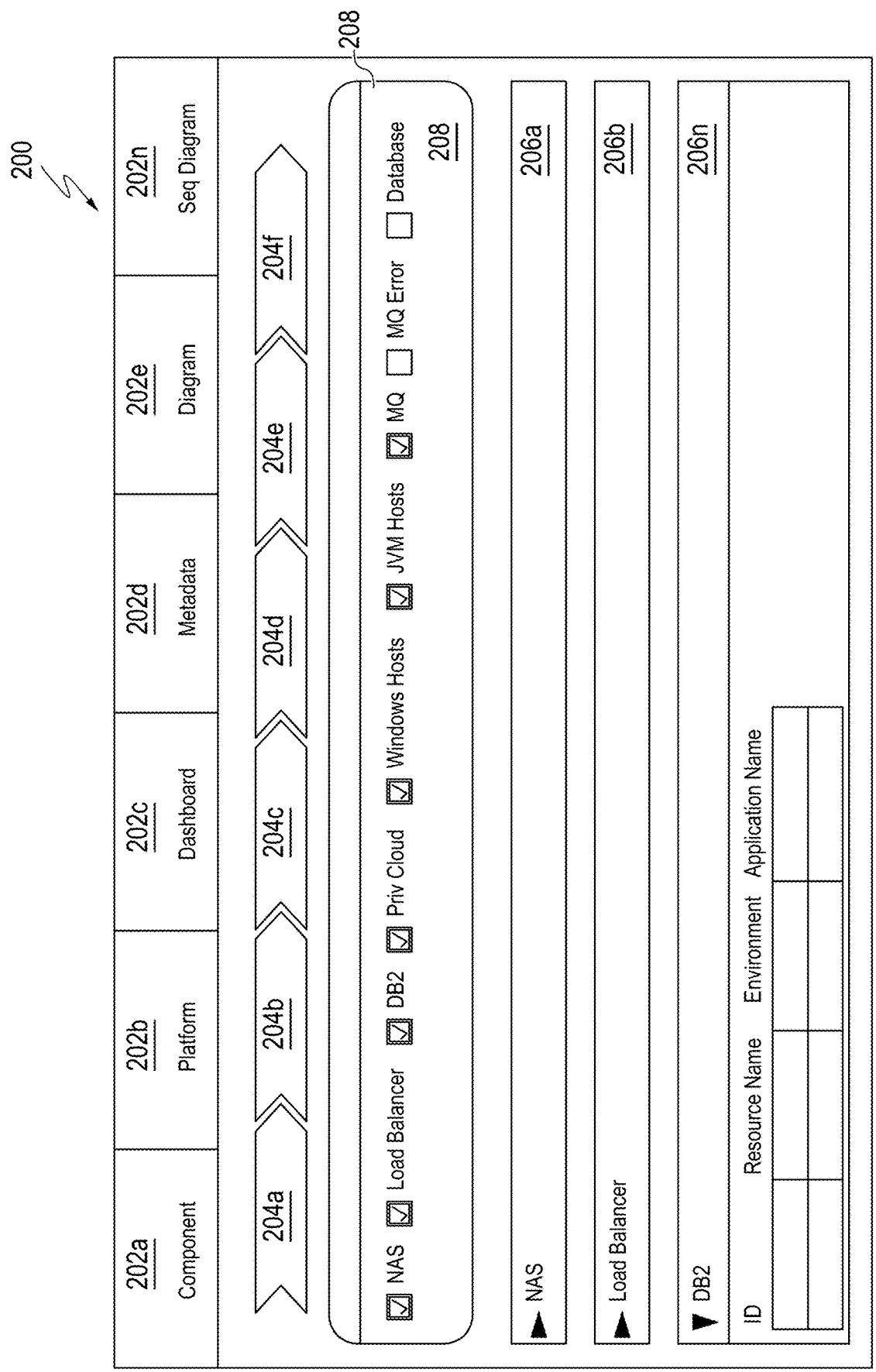
FIG. 2 shows an onboarding graphical user interface (GUI) that can be used to automatically discover network resources and generate platform metadata for a new platform, according to at least one embodiment of the present invention.

FIG. 2 shows an onboarding graphical user interface (GUI) 200 that can be used to automatically discover network resources and generate platform metadata for a new platform, according to at least one embodiment of the present invention. The onboarding GUI 200 allows platform developers to onboard a new platform into the performance management system 100 or manage an existing platform in the performance management system 100. The onboarding GUI 200 may execute the auto-discovery module 114, the processing module 116, the standardization module 118, and/or the metadata generation module 120 for configuring and onboarding a new platform. The onboarding GUI 200 may comprise a plurality of tabs 202a-b that allow the developer to configure infrastructure components 202a, configure, modify, or generate a new platform 202b, view the platform monitoring dashboard 202c, view metadata 202d, view infrastructure diagrams 202d, and view seq diagrams 202n.

In one example, the developer may select the platform tab 202b that displays a plurality of sequential configuration flow tabs 204a-n for onboarding a new platform. The sequential configuration flow tabs 204a-n allow the developer to execute the auto-discovery module 114 to identify network resources for the platform 204a and select identified applications 204b, execute the processing module 116 to review resource dependencies 204c, execute the standardization module 118 to merge metadata 204d and add monitor thresholds 204e for metrics or KPIs, and execute the metadata generation module 120 to download metadata and add the metadata to the platform management system 100. The resource dependencies flow tab 204c displays a resource pane 208 that allows the developer to select the identified network resources and resource dependency, including a network area storage system (NAS), load balancer (LB), DB2 database management and servers, Windows hosts, Java virtual machine (JVM) hosts, message queue (MQ), MQ error, and database. The selected network resources may be identified by a drop-down menus 206a-n that shows detailed resource information. The drop-down menus 206a-n may show a resource ID, resource name, environment (e.g., production, quality assurance (QA), development) application name, machine type (e.g., virtual machine, physical server), location, address, etc.

Once the network resources are selected and configured the developer may select scalable threshold models for the network resources. The thresholds may indicate specific ranges or points to display notifications in the platform GUI corresponding to infrastructure components, APIs, applications, or resource dependencies. The resource thresholds may correspond to a notification system with discrete color values, continuous color values, or a single value color or symbol. In one example, the scalable threshold models may adjust threshold values based on expected conditions (e.g., increased trading volume on the first trading day after a holiday; change in mid-day volume or patterns following news reports of current events, jobs report, or a statement by the Chairman of the Federal Reserve). Once the threshold values are added, the metadata may be downloaded and implemented into the platform management system for the new platform.

Figure 3:
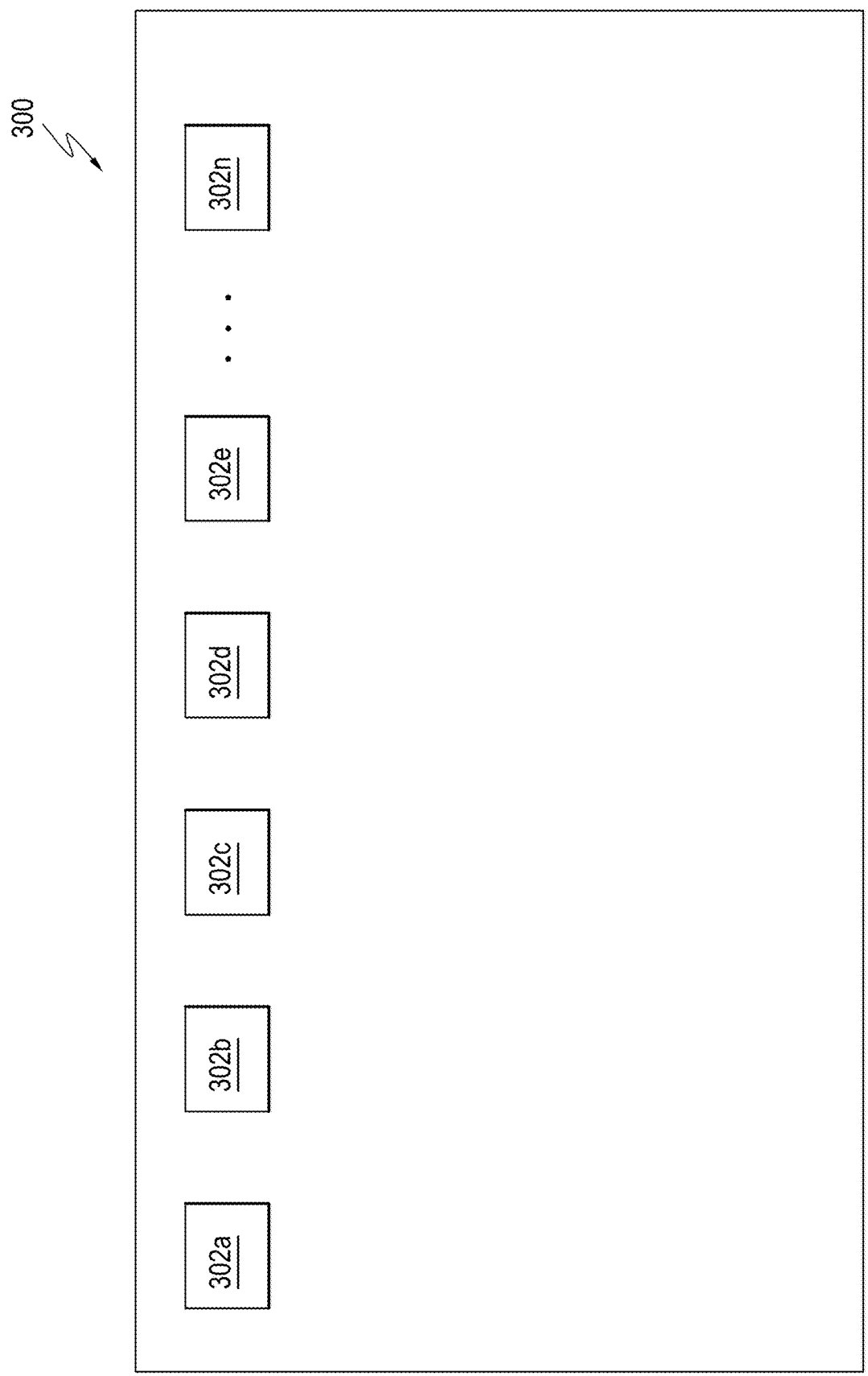
FIG. 3 shows a first view of a platform graphical user interface (GUI) that can be generated by the server system for a plurality of computing platforms, and provided to a user, according to at least one embodiment of the present invention.

FIG. 3 shows a first view 300 of a platform graphical user interface (GUI) that can be generated by the server system 104 for a plurality of computing platforms 302a-n, and provided to a user 110 (see FIG. 1), according to at least one embodiment of the present invention. The GUI (e.g., glass pane interface) can be hosted by the front-end server (e.g., web server) of the server system 104 (e.g., data center servers) for access by a plurality of client devices 110 (e.g., users) within the network 102. Each platform of the plurality of computing platforms 302a-n in the network 102 may correspond to a platform icon 302a-n in the first view and display a health indicator for in the platform icon. The plurality of platform icons may display a color (e.g., red=network resource issue; yellow=downward trend or underperformance of network resource; green=normal operation of network resource) or symbol overly (e.g. caution, alert) on the plurality of platform icons to display the platform health indicator. The plurality of platform icons 302a-n are selectable icons that displays the second view for a first platform, as shown by FIG. 4.

Figure 4:
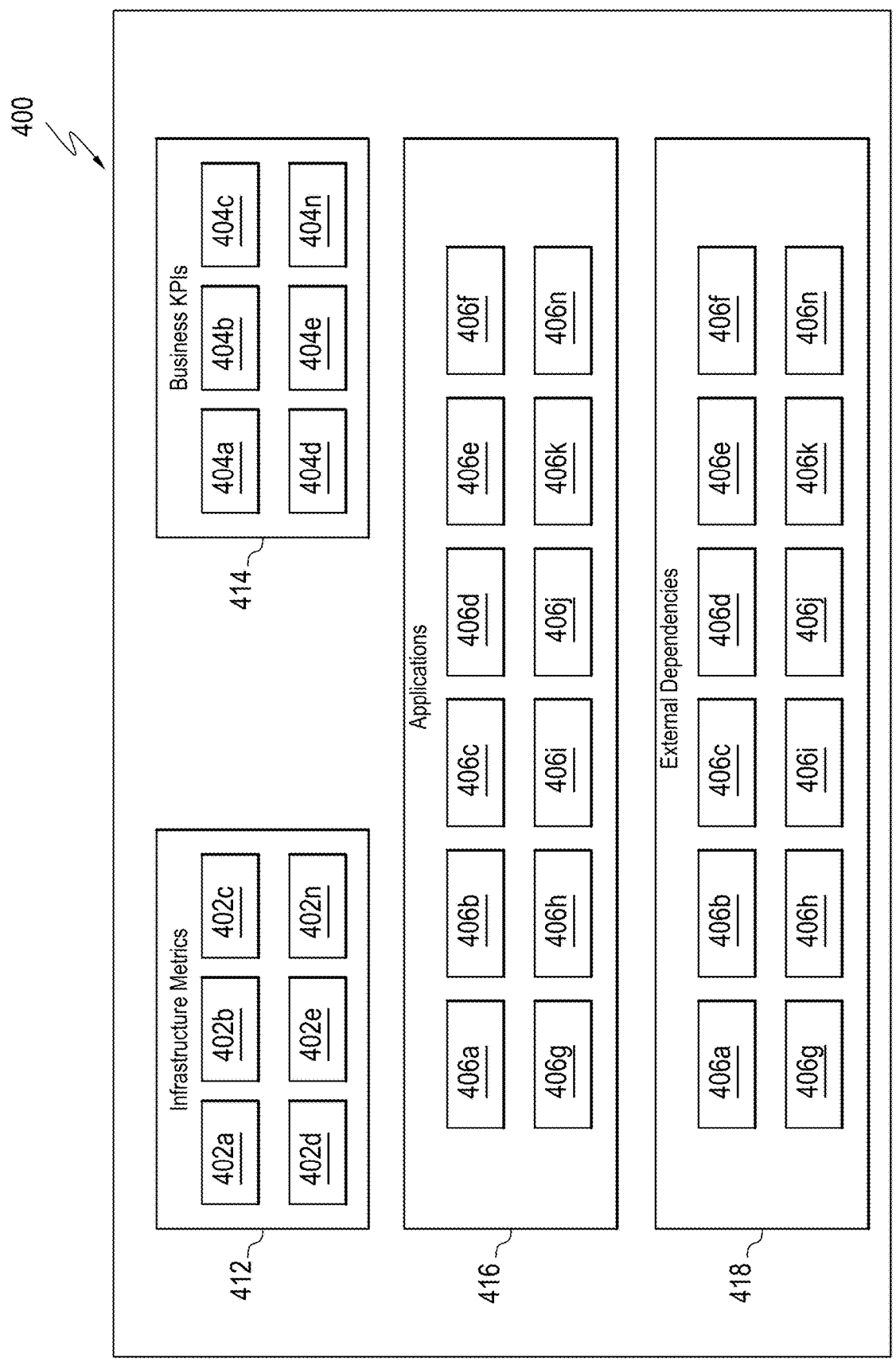
FIG. 4 shows a second view of the platform GUI that can be automatically generated by the server system for a first platform of a plurality of computing platforms, according to at least one embodiment of the present invention.

FIG. 4 shows a second view 400 of the platform GUI that can be automatically generated by the server system 104 for a first platform of a plurality of computing platforms 302a-n (see FIG. 3), according to at least one embodiment of the present invention. The second view 400 of the GUI comprises an aggregation of performance metrics associated with the first computing platform. The second view 300 can display information for various network resources, components, features and KPIs of the platform as selectable icons, such as infrastructure metrics 402a-n used to evaluate infrastructure components of the first platform and displayed in an infrastructure metrics pane 412; applications 406a-n used by the first platform and displayed in an applications pane 416; business-related KPIs 404a-n for the first platform and displayed in a KPI pane 414; and external dependencies 408a-n of the first platform in an external dependencies pane 418 of the platform GUI. The user of the client device 110 may select one of the selectable icons to display detailed information associated with the infrastructure components, applications (e.g., apps), KPIs and/or external dependencies (such as by clicking on the icon for the component, app, KPI and/or external dependency) to access, in another pane or view of the GUI (with examples show below). The detailed information may provide real-time or near-real time platform analytics for the specific item selected by the user.

In one example, the GUI may be configured to provide performance metrics associated a plurality of selected computing platforms customized by a user. The example of FIG. 4 shows an example GUI for a particular platform that the user could have reached by searching, in a search field, for the particular platform. If the user (or another user) selected a different platform, the GUI would be tailored for that platform, e.g., showing its infrastructure components, applications, business KPIs, etc. It should be recognized that some apps may be used in multiple platforms; that some infrastructure components may be used in multiple platforms; and that some infrastructure components (e.g., hosts) may host multiple applications for a single platform or multiple applications used across multiple platforms. The user may be a point of contact for the computing platform with permissions to perform a recovery or repair actions in response to an identified issue with an infrastructure component associated with the computing platform. Additionally, the permission settings for the user may allow read only/monitoring of computing platforms. The permission settings for the user may be assigned based on permissions of an entitlement database 112.

Figure 5A:
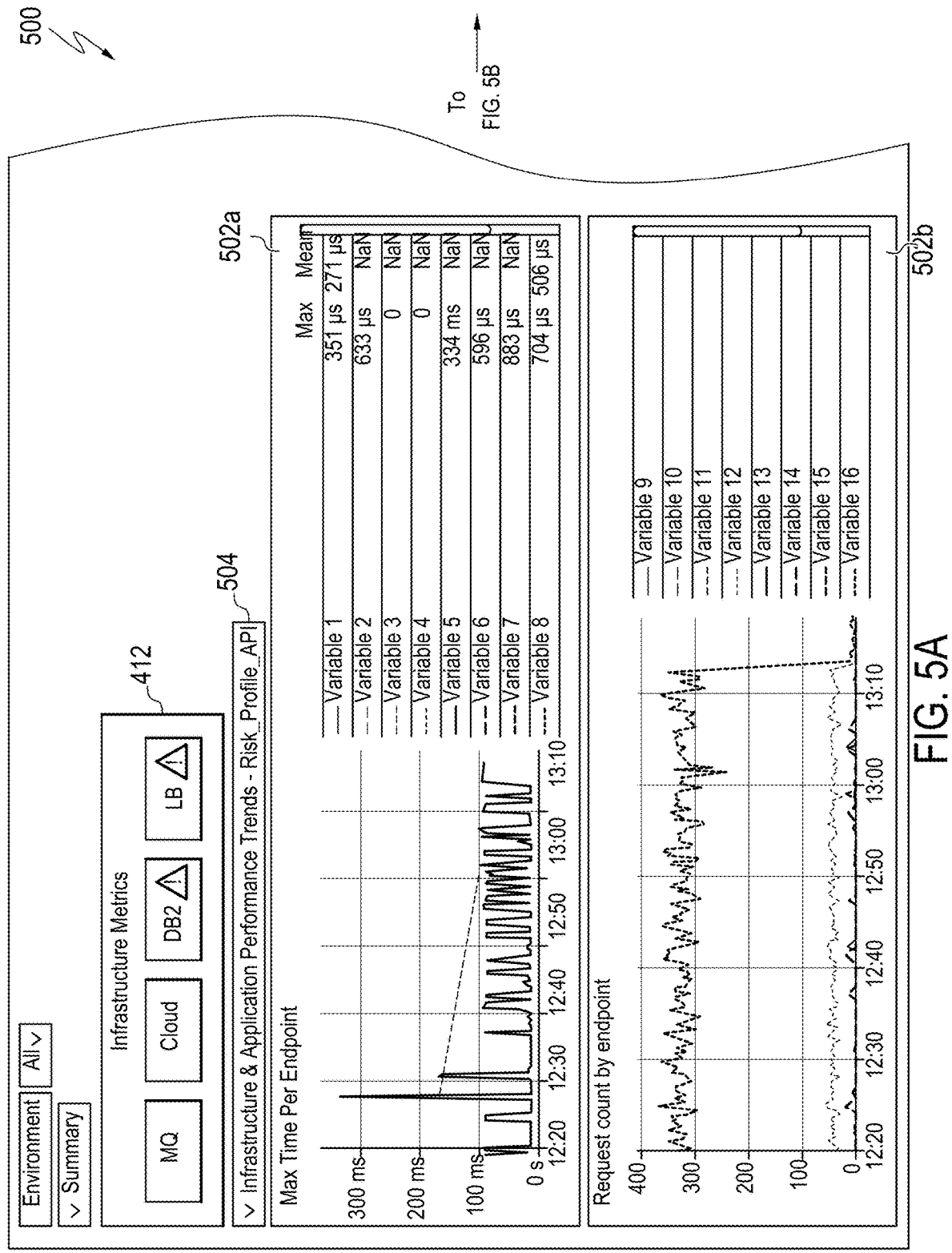
FIGS. 5A and 5B show a third view of the platform GUI comprising a plurality of graphical representations of infrastructure component analysis for a selected network resource (e.g., infrastructure component, API, application), according to at least one embodiment of the present invention.
Figure 5B:
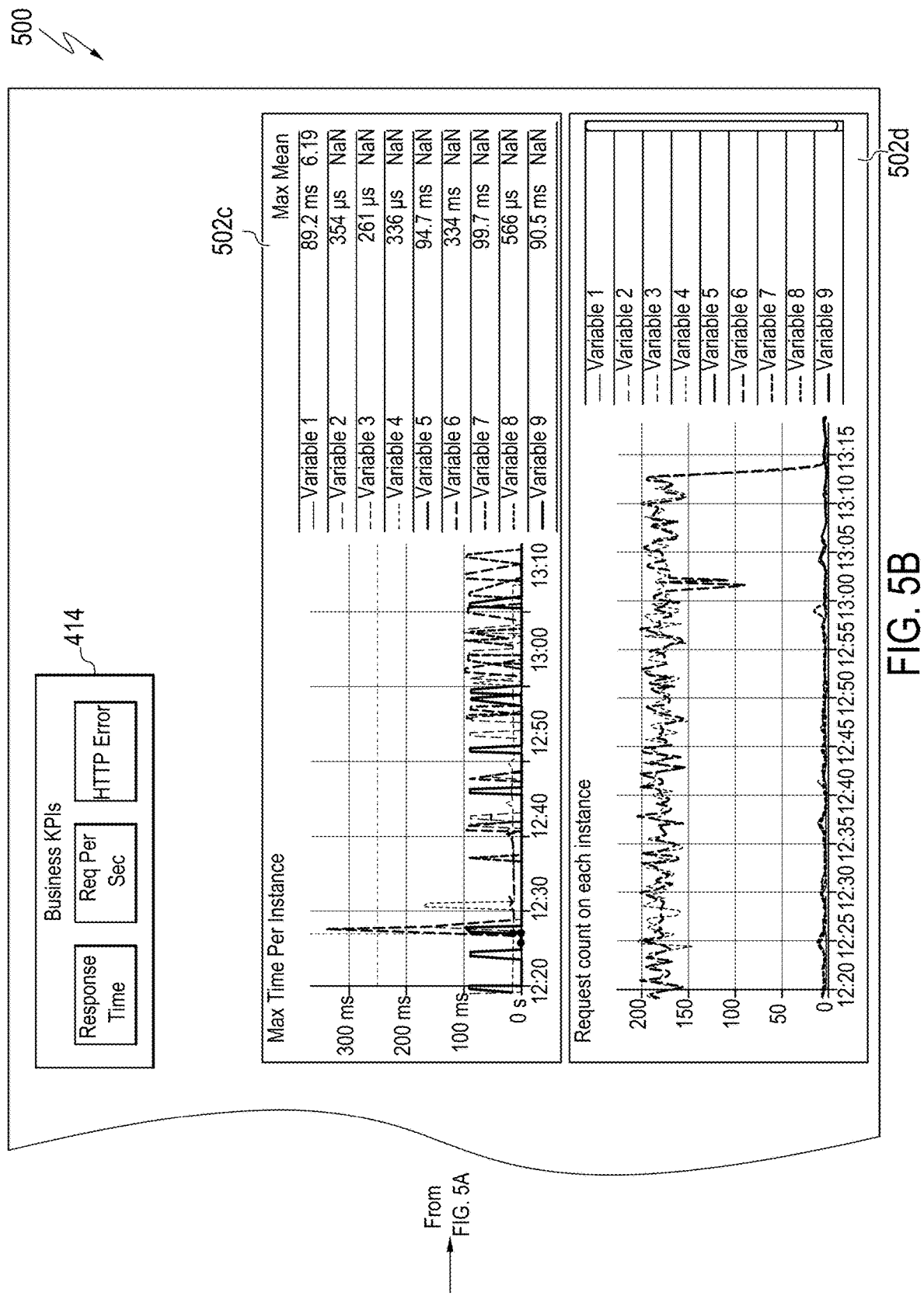

FIGS. 5A and 5B show a third view 500 of the platform GUI comprising a plurality of graphical representations of infrastructure component analysis 502a-d for a selected network resource (e.g., infrastructure component, API, application), according to at least one embodiment of the present invention. FIGS. 5A and 5B show a drop-down menu 504 associated with different analysis data for the infrastructure components or applications. Based on a user selection, the plurality of graphical representations of infrastructure component analysis 502a-d are displayed in the second third view 500 over a predetermined time interval (e.g., x-axis showing time in minutes). In one example, a risk profile API is selected from the drop-down menu 504 comprising a plurality of trend analysis data. The selection of the risk profile API causes the plurality of graphical representations of infrastructure component analysis 502a-d to be displayed. The plurality of graphical representations of infrastructure component analysis 502a-d comprise a max time per endpoint 502a, a request count endpoint 502b, a max time per instance 502c, and a request count on each instance 502d. Each of the plurality of graphical representations of infrastructure component analysis 502a-d comprise a legend showing individual plots for each metric. The legend may comprise granular data analysis for each plot in the graph.

FIGS. 5A and 5B further shows notification information in the infrastructure pane 412. For example, a database and a load balancer may be identified by the server system 104 as experiencing infrastructure issues. The selectable icons in infrastructure pane 412 may indicate an issue with specific infrastructure components based on a color or symbol. In one example, the plurality of performance metrics may be displayed as green when the underlying components are functioning properly but change to yellow (e.g., reduced performance) or red (e.g., offline or poor performance) based on the identification of performance issues. The color status may be based on threshold performance levels, or a continuous spectrum based on a deviation from an expected value. In another example, a reduced performance status may be indicated by the graphic overlay of a symbol (e.g., caution symbol). The infrastructure components may be the first indication of a performance issue in enterprise cloud network. As shown in the business KPI pane 414 of FIG. 5B, the KPIs do not indicate a reduced or poor performance. The KPIs for a computing platform may have a delayed response to an infrastructure component issue.

Once the server system 104 updated the metadata to indicate a performance issue associated with the computing platform, it may also provide a secondary notification to a point of contact associated with the computing platform. For example, the point of contact may be notified through a designated communication medium (e.g., email, sms, text, phone call, etc.) that an infrastructure component is experiencing an issue. The secondary notification allows the point of contact to be alerted in real time of the computing platform issue without the need to constantly monitor the GUI. Once the point of contact is notified, they may access the GUI through the client device 110 to obtain more information about the computing platform issue. The notification may also comprise a summary of the platform information and dependent components and KPIs associated with the computing platform issue.

Once the platform management system 100 identifies the source infrastructure component responsible for the computing platform KPI issues, the server system 104 may wait to for a manual resolution action from a client device 110 or may automatically perform a resolution action according to a predetermined set of procedures (e.g., infrastructure resolution playbook). A resolution database 112 may comprise an ordered procedure of repair instructions for an infrastructure component based on the component type. The component type may include host, application, load balancer, database, computational server, storage server, etc. The database server may comprise different resolution and repair instructions based on the component type. The server system 104 may chronologically execute the resolution actions or may start at an identified step based on an infrastructure component status. Additionally, the point of contact may initiate manual resolution actions based on the infrastructure component status.

Figure 6:
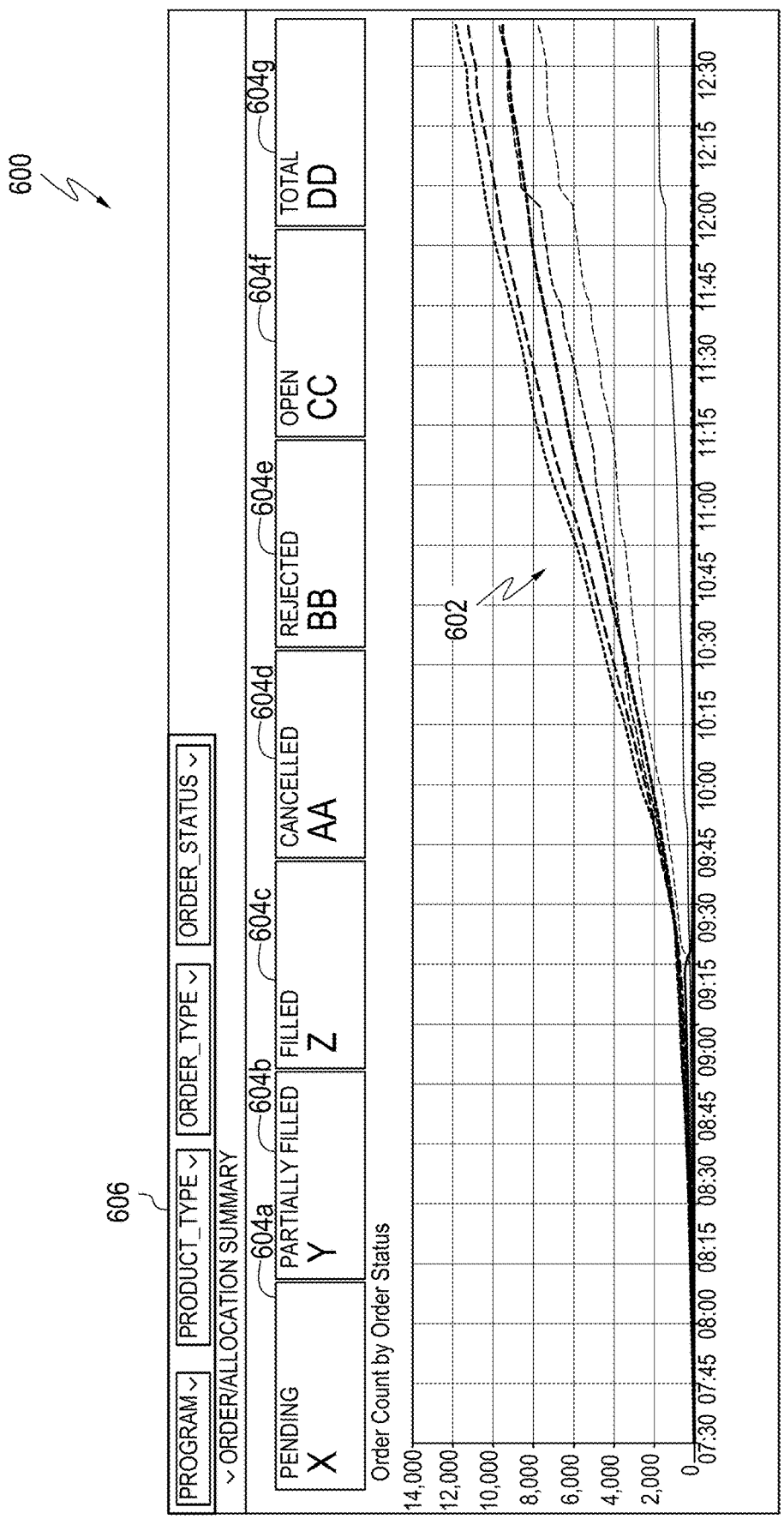
FIG. 6 shows a fourth view of the platform GUI interface comprising a plurality of graphical plots of KPI icons, according to at least one embodiment of the present invention.

FIG. 6 shows a fourth view 600 of the platform GUI interface comprising a plurality of graphical plots 602 of KPI icons 604*a-g*, according to at least one embodiment of the present invention. The plurality of KPI icons 604*a-g* may be the same KPIs displayed in the second view 400 and the third view 500 of the business KPI pane 414. By selecting the business KPI pane 414, the fourth view 600 may be created to show graphical plots 602 for the plurality of KPI icons 604*a-g*. The user may configure the plurality of KPI icons 604*a-g* or graphical plots 602 based on the selections made in the KPI menu 606. In one example, the KPIs show the order count by order status (i.e., y-axis) over time (i.e., x-axis).

Figure 7:
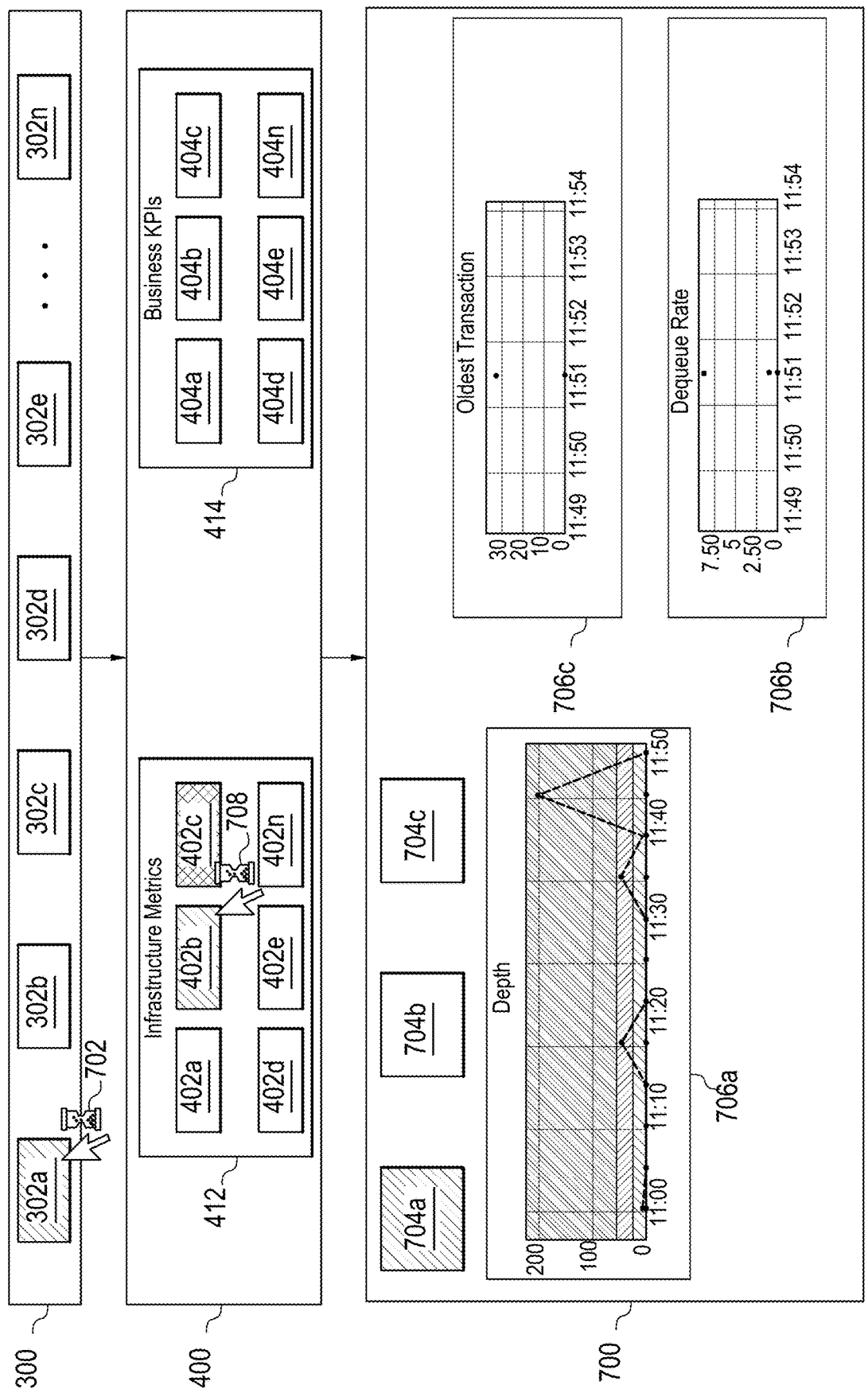
FIG. 7 shows a plurality of notification in the platform GUI, according to at least one embodiment of the present invention.

FIG. 7 shows a plurality of notification in the platform GUI, according to at least one embodiment of the present invention. The first view 300 of the platform GUI indicates a performance issue on the first computing platform by displaying a color notification in the first platform icon 302*a*. In one example, the first platform icon 302*a* displays a red status based on the most severe notification of the first platform. A user of the platform GUI may select 702 the first platform icon 302*a* to display the second view 400, specific to the first computing platform. The second view 400 shows two notifications in the infrastructure metric pane 412. In one example, the message queue (MQ) icon 402*b* indicates a red status (e.g., failure or performance issue) and the DB2 icon 402*c* indicates an orange or yellow (e.g., caution) status. The user of the platform GUI may select 708 the MQ icon 402*b* to display a fifth view 700. The fifth view 700 comprises a depth metric icon 704*a*, a dequeue rate icon 704*b*, and an oldest transaction metric icon 704*c*. Each icon 704*a-c* corresponds to a metric graph 706*a-c*. Metric graphs 706*b-c* show normal performance based on predetermined thresholds, while the depth metric graph 706*a* shows a queue depth spike at 11:50. After the user views performance issue, they may resolve the issue or view additional notifications.

Figure 8:
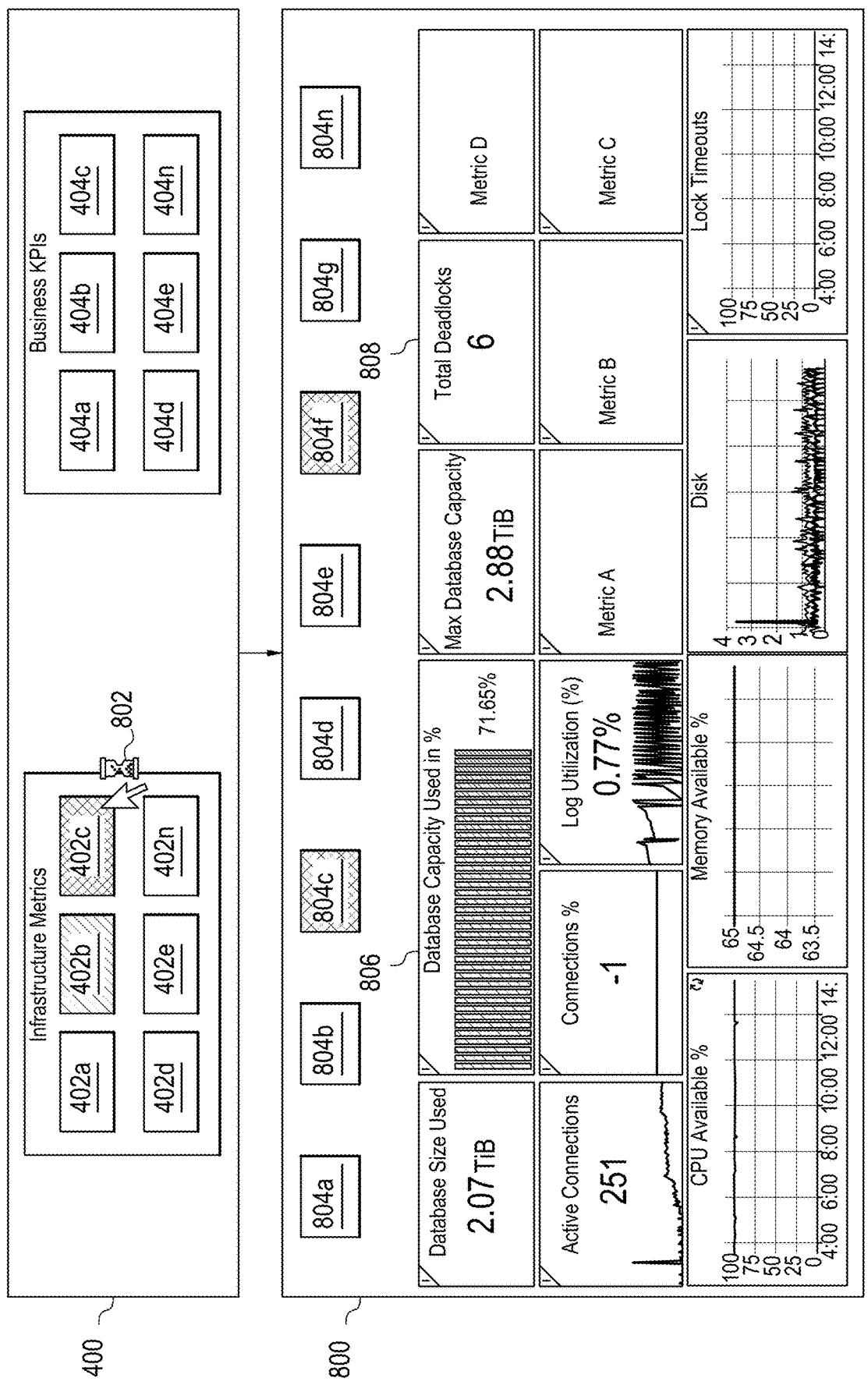
FIG. 8 shows a plurality of notification in a sixth view of the platform GUI, according to at least one embodiment of the present invention.

FIG. 8 shows a plurality of notification in a sixth view 800 of the platform GUI, according to at least one embodiment of the present invention. The user of the platform GUI may select 802 the DB2 icon 402*c* to display the sixth view 800. The sixth view 800 comprises a plurality of infrastructure metric icons 804*a-n* including CPU 804*a*, Disk 804*b*, capacity 804*c*, memory 804*d*, cache 804*e*, deadlock 804*f*, connections 804*g*, and lock wait 804*n*. Each of the infrastructure metric icons 704*a-c* corresponds to a graphical representation for the metric. In one example, the capacity icon 804*c* corresponds to the database capacity used percentage graphic 806 that shows a high percentage of capacity used, at 71.65%. The deadlock count icon 804*f* corresponds to the graphical display showing a total number of 6 database applications in a deadlock state. Accordingly, the user may restart the deadlocked database applications and thus resolving the queue depth issue and the database capacity issue.

Figure 9:
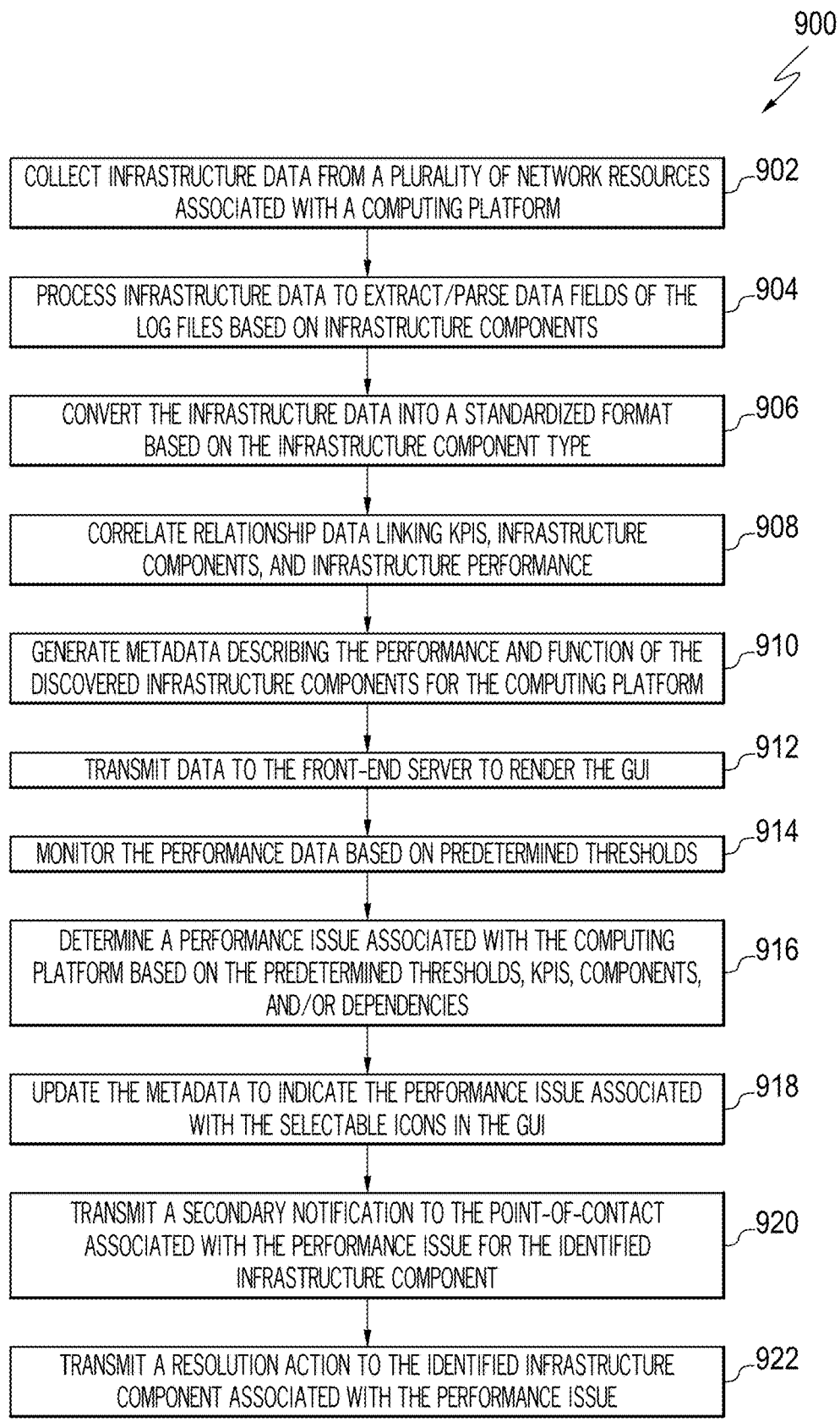
FIG. 9 is a logic flow diagram for automatically discovering network resources for a platform management system and monitoring metric thresholds to identify computing platform issues in a private enterprise cloud network, according to at least one embodiment of the present invention.

FIG. 9 is a logic flow diagram for automatically discovering network resources for a platform management system 100 and monitoring metric thresholds to identify computing platform issues in a private enterprise cloud network, according to at least one embodiment of the present invention. The auto-discovery module 114 of the server system 104 collects, at step 902, infrastructure data from a plurality of network resources (e.g., sources) associated with a first computing platform. The plurality of network resources may comprise data logs within the first computing platform, data log with a second computing platform that identify dependencies for the first computing platform, databases 112 on the network 102, etc. The server system 104 processes, at step 904, the infrastructure data by parsing the data fields associated with network resources including timestamps, source and destination IP addresses/ports for data packet logs, process identifiers (PIDs), error and status codes, and configuration details for infrastructure components. The server may utilize an aggregation tool or parsing tool to aggregate and extract structured and unstructured data associated the infrastructure components and application-level performance. The processing of the infrastructure data helps to discover network resources associated with the performance of the computing platform. The server system 104 converts, at step 906, the infrastructure data into a standardized format based on the infrastructure component type (e.g., host, application, load balancer, database, computational server, storage server, etc.). For example, each infrastructure component type may be associated with a standardized data format. The standardized data can be used to establish clear patterns between the underlying infrastructure components, their interdependency, and the KPIs of the computing platform. The server system 104 correlates, at step 908, clear links between network resources and their impact on the computing platform performance. The server system 104 employs statistical analysis, correlation algorithm, and other pattern recognition services to establish links between infrastructure components, application-level data, KPIs, and infrastructure component dependency relationships. In one example, the server system 104 correlates CPU usage spikes on a database server with a decrease in transaction throughput on an associated application service. This correlation enables IT teams to pinpoint the root cause of performance issues more effectively. The server system 104 generates, at step 910, metadata that summarizes and describes performance of the infrastructure components and include component names, types, roles, dependencies, configurations, and performance metrics. The metadata serves as a structured representation of the infrastructure environment, facilitating efficient analysis and monitoring.

Once the server system 104 has generated the metadata, the server system 104 transmits, at step 912, performance data including the KPIs, performance data for the network resources, application-level data, and correlation data to the front-end server 108, where the front-end server renders the GUI for the client device 110 within the private enterprise cloud network 102. The server system 104 monitors, at step 914, performance data against predetermined threshold models determined for each computing platform and the infrastructure components. The server system 104 determines, at step 916, performance issues based on the performance data and the predetermine thresholds. In response, the server system 104 updates, at step 918, the metadata for the GUI to indicate a performance issue associated with one of the network resources or infrastructure components. Additionally, the server system 104 transmits 920 a secondary notification to a point-of-contact associated with the identified performance issue. The server system 104 receives or determines 922 resolution action to resolve the performance issue. In one example, the server sends a requests to restart and reboot a load balancer that is determined to be offline.

The server system 104 may be implemented by one or a number of internetworked computers, such as servers. The software for the modules 114, 116, 118, 120 and other computer functions described herein may be implemented in computer software using any suitable computer programming language, such as PowerShell, .NET, C, C++, or Python, and using conventional, functional, or object-oriented techniques. For example, the server system 104 may be implemented with software modules (i.e., the modules 114, 116, 118, 120) stored or otherwise maintained in computer readable media, e.g., RAM, ROM, secondary storage, etc. One or more processing cores (e.g., CPU or GPU cores) of the server system 104 may then execute the software modules to implement the functions provided by the module. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to systems and methods for managing computing platforms of an enterprise network. The computing platforms can each provide a business-related service for the enterprise network, and the enterprise network can comprise a plurality of applications, application program interfaces (APIs), and network infrastructure components for implementing the computing platforms. In various embodiments, the system comprises a front-end server configurable to host a graphical user interface (GUI) a back-end server system communicably coupled to the front-end server. The back-end server system is configured to: collect and extract data from a plurality of sources related to a first computing platform of the computing platforms; identify network resources associated with the first computing platform, where the network resources comprise the network infrastructure components, the APIs, and applications for the first computing platform based on the extracted data for the first computing platform; determine correlations between performance metrics of the network resources and key performance indicators (KPIs) to the first computing platform; determine monitoring thresholds for the performance metrics and the KPIs associated with the network resources; generate metadata for the first computing platform, where the metadata comprises each of the identified network resources associated with the first computing platform, where the metadata describes application-level relationships with the network resources, dependency relationships between different network resources, and the monitoring thresholds for the performance metrics and the KPIs, of the first computing platform; and transmit the metadata associated with the first computing platform to the front-end server.

In various embodiments, the front-end server is configured to generate the GUI comprising: a plurality of selectable icons comprising infrastructure metric icons, application icons, resource dependency icons and KPI icons; each of the infrastructure metric icons correspond to one of the network infrastructure components of the first computing platform and dynamically indicates a real-time status of the network infrastructure components; each of the application icons corresponds to one of the applications of the first computing platform and dynamically indicates a real-time status of the applications; each of the resource dependency icons correspond to the network resources of the first computing platform and dynamically indicates a real-time status of interdependent network resources; and each of the KPI icons corresponds to one of the KPIs of the first computing platform and dynamically indicates a real-time status of the KPIs.

In various implementations, the extracted data identifies at least one of: component names, component types, component roles, component dependency relationships, component configurations, component performance metrics, or any combination thereof.

In various implementations, the plurality of sources comprises a plurality of system logs associated with the network resources. For example, the plurality of system logs can comprise at least one of: system logs, audit logs, network logs, application logs, database logs, middleware logs, or any combination thereof.

In various implementations, the back-end server system is further configured to determine a performance issue associated with the first computing platform, where the performance issue is determined based on a comparison to the monitoring thresholds, and where the GUI is configured to display an indication of the performance issue associated with the first computing platform. For example, the indication of the performance issue can be represented by a graphical overlay on a first selectable icon of the plurality of selectable icons in the GUI and/or by a color change of a first selectable icon of the plurality of selectable icons in the GUI. In various implementations, the performance issue is identified at a source infrastructure component, where the source infrastructure component is associated with a reduced performance of a first KPI of the KPIs for the first computing platform.

In various implementations, the back-end server system is further configured to: determine a secondary contact address for the first computing platform; and generate a notification to the secondary contact address associated with the performance issue at the source infrastructure component. In various implementations, the secondary contact address is a communication medium outside of the GUI. Still further, the back-end server system can be further configured to automatically perform a resolution action in response to the performance issue at the source infrastructure component, where the resolution action is based on a component type of the source infrastructure component and a resolution procedure guide.

In one general aspect, a method according to various embodiments of the present invention comprises the steps of: collecting, by a server system, infrastructure data for a plurality of network resources associated with a computing platform; identifying, by the server system, the plurality of network resources associated with the computing platform; parsing, by the server system, the infrastructure data to extract a first structured dataset associated with the plurality of network resources; converting, by the server system, the infrastructure data based in a standardized format for the plurality of network resources; correlating, by the server system, performance metrics of the plurality of network resources and key performance indicator (KPIs) to the computing platform; determining, by the server system, monitoring thresholds for the performance metrics and the KPIs associated with the plurality of network resources; and generating, by the server system, metadata describing dependency relationships between different components of the plurality of network resources, relationships between application-level data and the plurality of network resources, the KPIs and the performance metrics of the plurality of network resources, and the monitoring thresholds for the performance metrics and the KPIs.

In various implementations, the method further comprises generating, by the server system, a graphical user interface (GUI) comprising a plurality of selectable icons, where the plurality of selectable icons represent, the KPIs, the performance metrics of the plurality of network resources, the application-level data, and the dependency relationships between the different components of the plurality of network resources, and where the GUI is automatically updated based on a status of the plurality of network resources and the KPIs. In various implementations, the method further comprises the steps of: monitoring, by the server system, the performance metrics of the plurality of network resources and the KPIs; determining, by the server system, a performance issue based on the performance metrics of the plurality of network resources or the KPIs, where the performance issue is based on exceeding one of the monitoring thresholds; and updating, by the server system, the GUI to indicate the performance issue for the performance metrics and the KPIs of the computing platform. In various implementations, the method further comprises the step of generating, by the server system, a notification to a secondary contact address associated with the performance issue of the computing platform. In various implementations, the secondary contact address is a communication medium outside of the GUI. In various implementations, the method further comprises the steps of: determining, by the server system, a source infrastructure component associated with the performance issue, where the source infrastructure component is determined based on the dependency relationships between the different components of the plurality of network resources; and performing, by the server system, a resolution action on the source infrastructure component, wherein the resolution action is based on a component type of the source infrastructure component and a resolution procedure guide.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for managing computing platforms of an enterprise network, wherein the computing platforms each provide a business-related service for the enterprise network, and wherein the enterprise network comprises a plurality of applications, application program interfaces (APIs), and network infrastructure components for implementing the computing platforms, the system comprising:
a front-end server configurable to host a graphical user interface (GUI);
a back-end server system communicably coupled to the front-end server;
the back-end server system is configured to:
collect and extract data from a plurality of sources related to a first computing platform of the computing platforms;
identify network resources associated with the first computing platform, wherein the network resources comprise the network infrastructure components, the APIs, and applications for the first computing platform based on the extracted data for the first computing platform;
determine correlations between performance metrics of the network resources and key performance indicators (KPIs) to the first computing platform;
determine monitoring thresholds for the performance metrics and the KPIs associated with the network resources;
generate metadata for the first computing platform, wherein the metadata comprises each of the identified network resources associated with the first computing platform, wherein the metadata describes application-level relationships with the network resources, dependency relationships between different network resources, and the monitoring thresholds for the performance metrics and the KPIs, of the first computing platform; and transmit the metadata associated with the first computing platform to the front-end server; and the front-end server is configured to generate the GUI based on the metadata to show real-time status information for the first computing platform.

2. The system of claim 1, wherein:

the GUI comprises a plurality of selectable icons comprising infrastructure metric icons, application icons, resource dependency icons and KPI icons;

each of the infrastructure metric icons correspond to one of the network infrastructure components of the first computing platform and dynamically indicates a real-time status of the network infrastructure components;

each of the application icons corresponds to one of the applications of the first computing platform and dynamically indicates a real-time status of the applications;

each of the resource dependency icons correspond to the network resources of the first computing platform and dynamically indicates a real-time status of interdependent network resources; and each of the KPI icons corresponds to one of the KPIs of the first computing platform and dynamically indicates a real-time status of the KPIs.

3. The system of claim 1, wherein the extracted data identifies at least one of: component names, component types, component roles, component dependency relationships, component configurations, component performance metrics, or any combination thereof.

4. The system of claim 1, wherein the plurality of sources comprises a plurality of system logs associated with the network resources.

5. The system of claim 4, wherein the plurality of system logs comprises at least one of: system logs, audit logs, network logs, application logs, database logs, middleware logs, or any combination thereof.

6. The system of claim 2, the back-end server system is configured to determine a performance issue associated with the first computing platform, wherein the performance issue is determined based on a comparison to the monitoring thresholds, and wherein the GUI is configured to display an indication of the performance issue associated with the first computing platform.

7. The system of claim 6, wherein the indication of the performance issue is represented by a graphical overlay on a first selectable icon of the plurality of selectable icons in the GUI.

8. The system of claim 6, wherein the indication of the performance issue is represented by a color change of a first selectable icon of the plurality of selectable icons in the GUI.

9. The system of claim 6, wherein the performance issue is identified at a source infrastructure component, wherein the source infrastructure component is associated with a reduced performance of a first KPI of the KPIs for the first computing platform.

10. The system of claim 9, wherein the back-end server system is further configured to:

determine a secondary contact address for the first computing platform; and generate a notification to the secondary contact address associated with the performance issue at the source infrastructure component.

11. The system of claim 10, wherein the secondary contact address is a communication medium outside of the GUI.

12. The system of claim 10, wherein the back-end server system is further configured to automatically perform a resolution action in response to the performance issue at the source infrastructure component, wherein the resolution action is based on a component type of the source infrastructure component and a resolution procedure guide.

13. A method comprising:

collecting, by a server system, infrastructure data for a plurality of network resources associated with a computing platform, wherein each network resource has an associated data format;

identifying, by the server system, the plurality of network resources associated with the computing platform;

parsing, by the server system, the infrastructure data to extract a first structured dataset associated with the plurality of network resources;

converting, by the server system, the infrastructure data to the associated data formats for the plurality of network resources;

correlating, by the server system, performance metrics of the plurality of network resources and key performance indicator (KPIs) to the computing platform;

determining, by the server system, monitoring thresholds for the performance metrics and the KPIs associated with the plurality of network resources;

generating, by the server system, metadata describing dependency relationships between different components of the plurality of network resources, relationships between application-level data and the plurality of network resources, the KPIs and the performance metrics of the plurality of network resources, and the monitoring thresholds for the performance metrics and the KPIs; and generating, by a front-end server of the server system, a graphical user interface (GUI) based on the metadata, wherein the GUI comprises real-time status information for the computing platform.

14. The method of claim 13, wherein the GUI comprises a plurality of selectable icons, wherein the plurality of selectable icons represent, the KPIs, the performance metrics of the plurality of network resources, the application-level data, and the dependency relationships between the different components of the plurality of network resources, and wherein the GUI is automatically updated based on a status of the plurality of network resources and the KPIs.

15. The method of claim 14, further comprising:

monitoring, by the server system, the performance metrics of the plurality of network resources and the KPIs;

determining, by the server system, a performance issue based on the performance metrics of the plurality of network resources or the KPIs, wherein the performance issue is based on exceeding one of the monitoring thresholds; and updating, by the server system, the GUI to indicate the performance issue for the performance metrics and the KPIs of the computing platform.

16. The method of claim 15, further comprising:

generating, by the server system, a notification to a secondary contact address associated with the performance issue of the computing platform.

17. The method of claim 16, wherein the secondary contact address is a communication medium outside of the GUI.

18. The method of claim 15, further comprising:
- determining, by the server system, a source infrastructure component associated with the performance issue, wherein the source infrastructure component is determined based on the dependency relationships between the different components of the plurality of network resources; and
- performing, by the server system, a resolution action on the source infrastructure component, wherein the resolution action is based on a component type of the source infrastructure component and a resolution procedure guide.

19. The method of claim 14, wherein the metadata comprises at least one of: component names, component types, component roles, component dependency relationships, component configurations, component performance metrics, or any combination thereof.

20. The method of claim 14, wherein the metadata defines a structured representation of an infrastructure environment for the computing platform.

\* \* \* \* \*